R. J. Falconer,

Hose Coupling.

N° 9768.  Patented June 7, 1853.

UNITED STATES PATENT OFFICE.

RALPH JAMES FALCONER, OF WASHINGTON, DISTRICT OF COLUMBIA.

HOSE-COUPLING.

Specification forming part of Letters Patent No. 9,768, dated June 7, 1853; Reissued February 27, 1866, No. 2,181.

*To all whom it may concern:*

Be it known that I, R. J. FALCONER, of Washington city, District of Columbia, have invented a new and useful Improvement in Coupling Water-Hose, of which the following is a full description.

It is well known that with the hose couplings now in use, great difficulty is encountered in effecting a junction or coupling while the water is flowing through the hose, and in the cases where a head of water, force pumps or fire engines are employed to force the water, it becomes necessary to stop the engine, or where the water is brought from a fountain head the supply must be shut off above the break in the line of hose. At the present time there is but one kind of coupling in use by the fire departments throughout the country viz the screw coupling. It is found to be very objectionable for several reasons, but still is retained in general use for want of a better. With the screw coupling there is not only loss of time in shutting off the water but it requires considerable time to "set it up" and complete the joint. In such an emergency as a fire, expedition is of high importance, and it has been found by actual experiment with my new coupling that there is no necessity of shutting off the water, that the coupling can be made with the water flowing, no matter how forcibly, and that the joint "is set up" and made tight by a single blow from a mallet, and the joint may be broken with equal facility.

Figure 5:
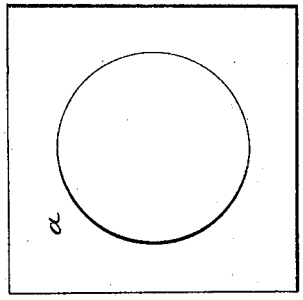
Figure 4:
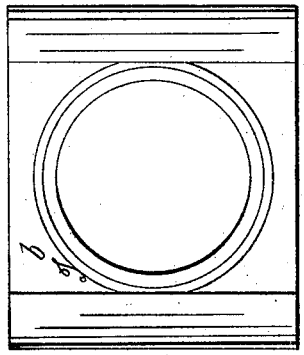
Figure 1:
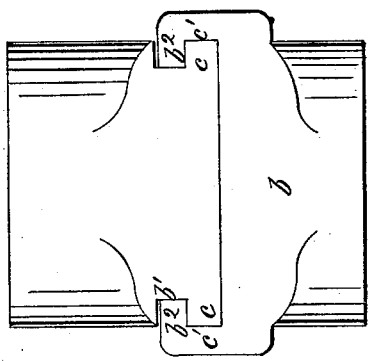
Figure 2:
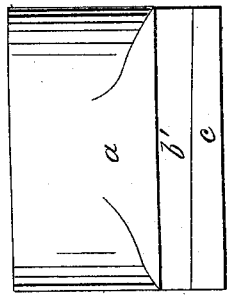
Figure 3:
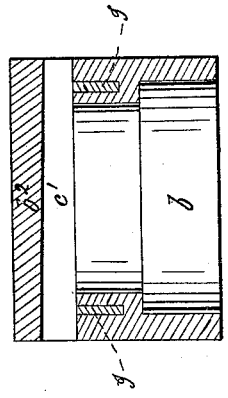

Figure 1 is a plan of the coupling, of which $a$ and $b$ are the principal parts, showing the coupling joints in cross section. Fig. 2, a lengthwise section of the joint of $a$. Fig. 3, ditto of $b$. Fig. 4 an end or face view of the part $b$. Fig. 5 ditto of $a$.

In Fig. 1 the parts $a$ and $b$ are shown as locked together. $b'$ is a groove in part $a$, which is made tapering in one direction as shown in the section Fig. 2. Into this groove fits the tapering flange $b^2$ of part $b$. In part $b$ there is also a tapering groove $c'$ to receive the tapering flange $c$ on part $a$. I, I, is a circular groove in part $b$ shown in section in Fig. 3 to receive a washer of leather, vulcanized rubber or other suitable material to assist in keeping the joint tight. It will be obvious that this coupling offers the utmost facility for effecting a junction at all times, but more particularly is its advantage realized when a junction is to be made while the water is flowing through the hose. From its simplicity of construction it will cost about one half the amount of the couplings at present in use, by the fire departments throughout the country. Another advantage in this particular use of the coupling, will be the facility of repair or replacement.

At present there is but one source of supply for couplings for the fire departments, and the same screw thread for all, and hence the difficulty of supply or repair at the various localities. With a coupling like mine no such difficulty will be experienced and the coupling can be furnished by any common machine shop.

I am aware that the draw-slide is not a new device in itself, and I do not therefore claim the draw-slide as a means of making a tight joint merely, but

I claim—

The employment of the slide coupling in combination with the collars of hose in the manner and for the purpose set forth, by which I am enabled in the case of water hose to effect the coupling with the utmost facility while the water is flowing through the hose.

RALPH JAMES FALCONER.

Witnesses:
C. H. McCORMICK,
WM. GREENOUGH.

[FIRST PRINTED 1913.]